US008438599B2

(12) United States Patent  
Yuzawa (10) Patent No.: US 8,438,599 B2
(45) Date of Patent: May 7, 2013

(54) CONTENT GUIDE INFORMATION PROCESSING APPARATUS, CONTENT GUIDE INFORMATION PROCESSING METHOD AND COMPUTER PROGRAM THEREOF

(75) Inventor: Keiji Yuzawa, Saitama (JP)

(73) Assignee: Sony Corporation (JP)

( * ) Notice: Subject to any disclaimer, the term of this patent is extended or adjusted under 35 U.S.C. 154(b) by 53 days.

(21) Appl. No.: 12/217,025

(22) Filed: Jun. 30, 2008

(65) Prior Publication Data

US 2008/0271081 A1 Oct. 30, 2008

Related U.S. Application Data

(63) Continuation of application No. 10/914,745, filed on Aug. 9, 2004, now abandoned.

(30) Foreign Application Priority Data

Aug. 12, 2003 (JP) ................................. 2003-291995

(51) Int. Cl.  
*H04N 5/445* (2011.01)

(52) U.S. Cl.  
USPC .............................................. 725/49; 725/50

(58) Field of Classification Search .................. None  
See application file for complete search history.

(56) References Cited

U.S. PATENT DOCUMENTS

| | | | |
|---|---|---|---|
| 5,353,121 A | 10/1994 | Young et al. | |
| 5,635,989 A * | 6/1997 | Rothmuller | 725/46 |
| 5,754,258 A | 5/1998 | Hanaya et al. | |
| 5,808,694 A | 9/1998 | Usui et al. | |
| 6,351,596 B1 * | 2/2002 | Ostrover | 386/46 |
| 6,769,127 B1 * | 7/2004 | Bonomi et al. | 725/39 |
| 7,043,747 B1 * | 5/2006 | Cohen | 725/34 |
| 7,150,029 B1 | 12/2006 | Ebling et al. | |
| 7,272,844 B1 * | 9/2007 | Bankers et al. | 725/78 |
| 7,369,750 B2 * | 5/2008 | Cheng et al. | 386/292 |
| 2002/0138840 A1 * | 9/2002 | Schein et al. | 725/61 |
| 2003/0037335 A1 * | 2/2003 | Gatto et al. | 725/86 |
| 2003/0093790 A1 * | 5/2003 | Logan et al. | 725/38 |
| 2004/0040036 A1 * | 2/2004 | An | 725/39 |
| 2004/0078807 A1 * | 4/2004 | Fries et al. | 725/14 |

FOREIGN PATENT DOCUMENTS

| | | |
|---|---|---|
| JP | 6-504165 A | 5/1994 |
| JP | 08-111823 A | 4/1996 |
| JP | 10-294922 | 11/1998 |
| JP | 11-261908 | 9/1999 |
| JP | 2000-287179 | 10/2000 |
| JP | 2000-295585 A | 10/2000 |
| JP | 2001-148812 | 5/2001 |
| JP | 2002-057966 | 2/2002 |
| JP | 2002-354386 | 12/2002 |
| WO | 99/20049 | 4/1999 |
| WO | 01/15444 | 3/2001 |

* cited by examiner

*Primary Examiner* — Chenea Smith  
(74) *Attorney, Agent, or Firm* — Lerner, David, Littenberg, Krumholz & Mentlik, LLP (57) ABSTRACT

Guide information is provided relating to playing/viewing of content retrieved through various modalities such as television broadcasting and a computer network. A unified program list is created that comprehensively handles program content. For a self-recorded program, program metadata retrieved during a recording operation is additionally registered. For a network program, a network program list is periodically retrieved from a service site, modified and recorded. To play the content, a guide screen is created and supplied based on a unified program list. When a self-recorded program is selected, the program is read and played from an HDD. When a network program is selected, the program is played in a streaming manner via the Internet.

19 Claims, 6 Drawing Sheets

FIG. 2

```
UNIFIED PROGRAM LIST EXAMPLE: BLANK

<localcontentlist>
</localcontentlist>
```

FIG. 3

```
UNIFIED PROGRAM LIST EXAMPLE: WITH ONE SELF-RECORDED PROGRAM

<localcontentlist>
<content>                                      ← PROGRAM 1
<type> SELF-RECORDED PROGRAM</type>            ← INDICATES SELF-RECORDED PROGRAM
<title> CH-4 AT 21:00, MARCH 10</title>        ← PROGRAM NAME
<honpen> c:¥content¥l1.mpg</honpen>            ← STORAGE PLACE
</content>
</localcontentlist>
```

FIG. 4

```
UNIFIED PROGRAM LIST EXAMPLE: WITH TWO SELF-RECORDED PROGRAMS

<localcontentlist>
<content>                                      ← PROGRAM 1
<type> SELF-RECORDED PROGRAM</type>            ← INDICATES SELF-RECORDED PROGRAM
<title> CH-4 AT 21:00, MARCH 10</title>        ← PROGRAM NAME
<honpen> c:¥content¥l1.mpg</honpen>            ← STORAGE PLACE
</content>
<content>                                      ← PROGRAM 2
<type> SELF-RECORDED PROGRAM</type>
<title> CH-8 AT 18:00, MARCH 12</title>
<honpen> c:¥content¥l2.mpg</honpen>
</content>
</localcontentlist>
```

FIG. 5

```
UNIFIED PROGRAM LIST EXAMPLE: WITH TWO SELF-RECORDED PROGRAMS

URL HTTP://streming.sony.co.jp/contentlist/
<netcontentlist>
<update> APRIL 1, 2003</update>          ← UPDATE DATE OF NETWORK PROGRAM LIST
</content>                                ← PROGRAM 1
<title> HANA'S CoCoon LIFE</title>
<honpen> HTTP://streming.sony.co.jp/content/n1.mpg/</honpen>
</content>
<content>                                 ← PROGRAM 2
<title> BALLACAN'S CoCoon LIFE</title>
<honpen> HTTP://streming.sony.co.jp/content/n2.mpg/</honpen>
<content>
</netcontentlist>
```

FIG. 6

```
UNIFIED PROGRAM LIST EXAMPLE:
  WITH TWO SELF-RECORDED PROGRAMS AND TWO NETWORK PROGRAMS

<localcontentlist>
<content>                                      ← PROGRAM 1
<type> SELF-RECORDED PROGRAM</type>            ← INDICATES SELF-RECORDED PROGRAM
<title> CH-4 AT 21:00, MARCH 10</title>        ← PROGRAM NAME
<honpen> c:¥content¥l1.mpg</honpen>            ← STORAGE PLACE
</content>
<content>                                      ← PROGRAM 2
<type> SELF-RECORDED PROGRAM</type>
<title> CH-8 AT 18:00, MARCH 12</title>
<honpen> c:¥content¥l2.mpg</honpen>
</content>
<content>                                      ← PROGRAM 3
<type> NETWORK PROGRAM</type>                  ← INDICATES NETWORK PROGRAM
<title> HANA'S CoCoon LIFE</title>
<honpen> HTTP://streming.sony.co.jp/content/n1.mpg/</honpen>
</content>
<content>                                      ← PROGRAM 4
<type> NETWORK PROGRAM</type>
<title> BALLACAN'S CoCoon LIFE</title>
<honpen> HTTP://streming.sony.co.jp/content/n2.mpg/</honpen>
</content>
</localcontentlist>
```

FIG. 8

| | |
|---|---|
| POWER | : POWER ON OR OFF |
| PROGRAM LIST | : DISPLAY PROGRAM LIST |
| ↑↓ ← → | : MOVE POSITION TO SELECT |
| OK | : PLAY SELECTED PROGRAM |
| DELETE | : DELETE SELECTED PROGRAM |
| CH+ | : CH+ AND RECEIVE THE PROGRAM BROADCASTING |
| CH- | : CH- AND RECEIVE THE PROGRAM BROADCASTING |
| RECORD | : RECORD RECEIVING PROGRAM BROADCASTING |
| STOP | : STOP RECORDING | ns
CONTENT GUIDE INFORMATION PROCESSING APPARATUS, CONTENT GUIDE INFORMATION PROCESSING METHOD AND COMPUTER PROGRAM THEREOF

CROSS-REFERENCE TO RELATED APPLICATIONS

The present application is a continuation of U.S. patent application Ser. No. 10/914,745, filed Aug. 9, 2004 which claims priority from Japanese Application No. 2003-291995 filed Aug. 12, 2003, the disclosures of which are hereby incorporated by reference herein.

BACKGROUND OF THE INVENTION

The present invention relates to a content guide information processing apparatus, content guide information processing method and computer program for processing content guide information for guiding content viewing. In particular, the invention relates to a content guide information processing apparatus, content guide information processing method and computer program for processing guide information relating to playing/viewing of content which has been stored once.

More specifically, the invention relates to a content guide information processing apparatus, content guide information processing method and computer program for processing guide information relating to the playing/viewing of content retrieved through various modalities, such as television broadcasts and a computer network and, in particular, to a content guide information processing apparatus, content guide information processing method and computer program for clearly providing users with content guide information in formats compliant with different modalities.

Broadcasting plays significantly greater roles in today's information based society. In particular, television broadcasting directly provides audio and video information to audiences and has great influence in society. Broadcasting technologies include a wide variety of technologies, such as signal processing, signal communication and audio/video information processing. Various modalities are available for providing users with program content, including broadcasting by radio waves, such as terrestrial waves and satellite waves, cable television and network programs to be provided through computer communication.

An extremely high percentage of homes have television, and almost all homes have televisions. Thus, broadcasting content distributed from broadcasting stations is viewed by huge numbers of people. Alternatively, broadcasting content can be viewed by recording received content on a viewer side once, and then playing the content at any preferred time.

In recent years, a large amount of video/audio ΔV data can be stored with the advance of digital technologies. For example, a hard disk drive (HDD) having several tens of GB (gigabytes) or larger capacities can be purchased at relatively low prices. Hard disk drive (HDD) recorders, personal computers (PCs) having television program recording/viewing functions and, television receivers (set-top boxes) each containing an HDD and so on have also been available.

An HDD is an apparatus in which recorded data is randomly accessible. Therefore, in playing recorded content, recorded programs do not have to be simply sequentially played from the beginning as with a conventional videotape. The playing of a preferred program (or a specific scene or specific corner in a program) can be started directly.

However, with an increase in the capacity of an HDD, a user sometimes must think about content selection, such as which television program should be viewed first among many stored programs. In order to prevent keeping stored content idle and to effectively use the stored content, some viewing support may be necessary.

For example, a so-called Electrical Program Guide (EPG) system is known in which a program guide for selecting a broadcast television program over image signals is transmitted to a display apparatus, and the receiving display apparatus displays the program guide. The EPG is obtained in parallel with the process of recording a broadcast program, and a user can obtain a certain viewing support effect from the EPG to be provided when the user plays and views the recorded program.

Here, an EPG system may be of a Vertical Blanking Interval (VBI) system (as disclosed in JP-T-6-504165 or U.S. Pat. No. 5,353,121) or of a digital satellite type to be used in a Digital Satellite System (DSS, which is a trademark of Hughes Communication, as disclosed in JP-A-8-111823).

In general terrestrial television broadcasts (in the Very High Frequency (VHF) band) of a VBI system, VBI data of an EPG is transmitted so that the position of the EPG does not affect the horizontal scanning lines of the original image. A receiver thereof can create display data of the EPG from the VBI data and display the display data on a monitor.

In the digital satellite system, EPG data and original image data are digitized, packetized and transmitted. A receiver thereof stores the EPG data in a memory, creates corresponding display data and displays the display data on a monitor.

On the other hand, an EPG in a format compliant with each provider is often provided in moving image content, that is, a "network program" to be provided from a predetermined moving image distribution service site over the Broadband Internet. In this case, the EPG data is stored in a memory, and corresponding display data is created. Thus, the display data can be displayed on a Web browser, for example.

In both of the systems, a user can select a program that the user desires to view with reference to an electronic program guide or a program list in another form displayed on a monitor.

However, independent formats and/or forms exist for providing an EPG or program list function for respective systems for broadcasting, distributing and providing content. Thus, program information (that is, guide information relating to the playing/viewing of content) must be provided on a monitor through separate user interfaces. Therefore, users cannot view different program information at-a-glance and it is hard for users to understand.

For example, in order to view a desired program in either terrestrial broadcasting or satellite broadcasting, the program is searched in an EPG of a VBI system and is checked to see whether the program is provided in terrestrial broadcasting. When the desired program is not on the list of the EPG, the program is searched in an EPG for satellite broadcasting in the same manner. In this case, it is a complicated procedure to view a predetermined program fast and securely.

For example, a system has been proposed that allows the fast and secure selection of a desired program on a display of an integration of EPGs in different formats of broadcast content (as disclosed in JP-A-2000-295585).

However, an EPG is originally a description of guide information relating to program content on air but is not independent guide information for content (self-recorded content) stored in a user's recorder, such as an HDD recorder.

The integration of an EPG for broadcast content and an EPG for network programs, that is, the integration of EPGs for content in different modalities, is not provided. Therefore, users cannot view the EPGs at a glance, which is hard for users to understand. Apparently, no system provides guide information including an integration of self-recorded content and network program content.

In other words, no system provides content stored in an HDD recorder by a user through a unified user interface irrespective of modalities. Thus, users cannot view guide information on a recorder/player at a glance, and the users' operability is not high.

SUMMARY OF THE INVENTION

The present invention provides a sophisticated content guide information processing apparatus, contents guide information processing method and computer program, which allow preferable processing on guide information relating to the playing/viewing which has been stored.

The invention also provides a sophisticated content guide information processing apparatus, content guide information processing method and computer program, which allow processing of guide information relating to the playing/viewing of content retrieved through various modalities such as television broadcasting and computer networks.

The invention further provides a content guide information processing apparatus, content guide information processing method and computer program, which can achieve high operability in playing content by providing users with an easy-to-see guide of integrated content information in different forms that are compliant with the respective modalities through an at-a-glance unified user interface.

According to one aspect of the invention, there is provided a content guide information processing apparatus for guiding content viewing, wherein the apparatus includes a content receiver for receiving content through different modalities; a memory for storing received content; a content player for playing receiver or stored content; a content guide information management section for managing content guide information having integration of content received through different modalities to be supplied; and a supply section for supplying content guide information.

Preferably, the content receiver may receive program contents through television broadcasting or a distribution service over a network. Further, the content guide information management section may manage a unified program list as content guide information.

Preferably, the content receiver may retrieve program metadata in response to receiving of television broadcasting or receive a program list periodically or in predetermined timing from a service site distributing moving image programs.

Preferably, the content guide information management section may additionally register content information with the contents guide information when the content is stored in the memory. Alternatively, the content guide information management section may additionally register or modify and register a detail of a program list with the content guide information when the program list is received periodically or in a predetermined timing from a service site distributing moving image programs.

Therefore, with the contents guide information processing apparatus according to a preferred aspect of the invention, a unified program list is created in which program content provided by different modalities, such as a broadcasting program and a network program, are comprehensively handled.

On the unified program list, content can be viewed at glance irrespective of modalities, and a user does not have to know which modality is adopted for retrieving each content.

Preferably, in order to play content, a user interface screen provided to and manipulated by a user is created based on an at-a-glance unified program list and is displayed on the screen of a monitor. When a program selected by a user to play is a self-recorded program, a corresponding program is read from a local storage device, such as a HDD, and the content is played. If a selected program is a network program, a corresponding program is preferably played in a streaming form over the Internet.

In a preferred embodiment, the memory may encode received content as required and store the encoded contents. The contents guide information may also be described in a structured description language.

According to a further aspect of the invention, there is provided a program executable by an information processing system such as content guide information processing apparatus or a computer for managing contents guide information guiding content viewing, the program causing the system or apparatus to receive content through different modalities; store received content; play received or stored content; manage content guide information having integration of content received through different modalities to be supplied; and supply content guide information. Preferably, the receiving step of content retrieves program metadata in response to receiving television broadcasting or receives a program list periodically or in predetermined timing from a service site distributing moving image programs. Further preferred is that the content guide information managing additionally registers content information with the content guide information when the content is stored or registers or modifies and registers a detail of a program list with the content guide information when the program list is received periodically or in predetermined timing from a service site distributing moving image programs.

Preferably, the program according to an aspect of the invention may be a computer program stored in computer-readable form so as to perform, on a computer system, predetermined processing. In other words, a computer program according to the invention may be installed in a computer that functions as a content information processing apparatus so that the same advantages can be obtained as those of a content guide information processing apparatus according to the invention.

Other features and advantages of the present invention will be apparent from the detail descriptions with reference to embodiments of the invention, which are described below, and in reference to attached drawings.

DETAILED DESCRIPTION

Embodiments of the invention are described below in detail with reference to the drawings.

The invention relates to a content guide information processing apparatus for providing users with at-a-glance unified content guide information relating to content to be provided in formats compliant with different modalities through a unified user interface.

Figure 1:
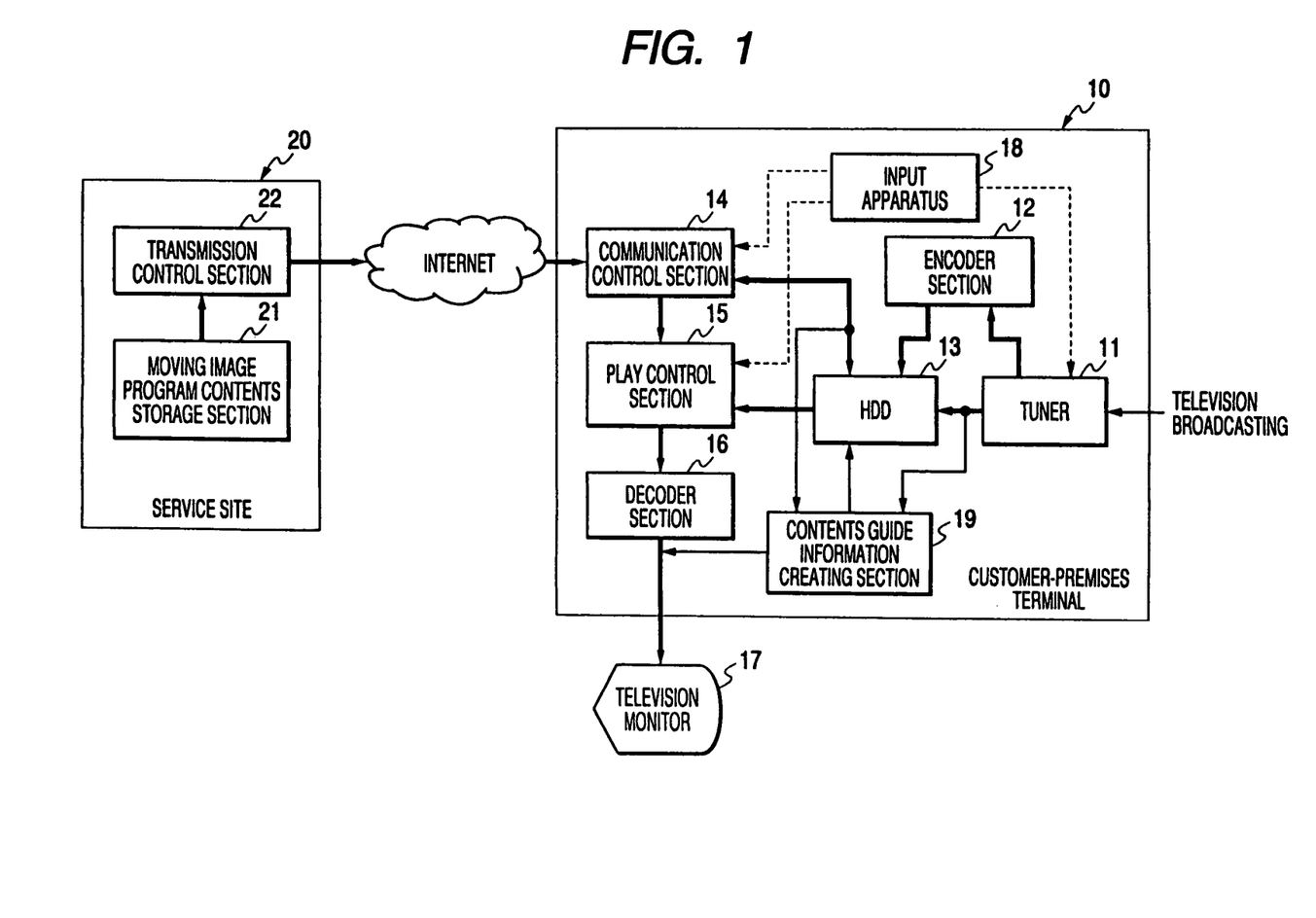
FIG. 1 is a diagram schematically showing a sample construction of a content guide information processing apparatus according to an embodiment of the invention.

FIG. 1 schematically shows an example of a content guide information processing apparatus according to an embodiment of the invention. In this example, the content guide information processing apparatus is implemented as a customer premises terminal 10, including a television broadcasting receiving function, a moving image program distribution service receiving function over the broadband Internet, and a recording/playing function for recording and playing moving image programs retrieved through various modalities.

The customer premises terminal 10 includes a tuner 11, an encoder section 12, a hard disk drive (HDD) 13, a communication control section 14, a play control section 15, a decoder section 16, a television monitor 17, an input apparatus 18 and a guide information creating section 19.

The customer premises terminal 10 starts an operation, such as receiving television broadcasting, receiving moving image program distribution service over the Internet, recording received broadcasting/moving image content, and playing recorded content, in response to user input or manipulation (which may include a remote control operation) through the input apparatus 18. The customer premises terminal 10 may also perform operations relating to playing recorded content such as fast-forwarding, rewinding and pausing and/or an operation such as deleting recorded content.

Broadcast waves received by an antenna (not shown) are supplied to the tuner 11. The broadcast waves may be any one of terrestrial waves, satellite waves, digital broadcasting and/or analog broadcasting. The tuner 11 tunes broadcast waves at a predetermined channel, that is, it can select a station in accordance with instructions from a user through the input apparatus 18.

In accordance with an instruction from a user through the input apparatus 18, the communication control section 14 accesses a predetermined service site over the broadband Internet and downloads desired moving image program content (such as a network program).

Like broadcasting content (server type broadcasting), when a program that a user selects to view is a network program, the program may be stored in the HDD 13 once and may be played. Here, according to this embodiment, assuming that a network program can be downloaded from a predetermined service site 20 as required, a corresponding program in a streaming form over a network can be played.

The customer premises terminal 10 includes the HDD 13 as a memory apparatus for recording/playing content to be provided by broadcast waves or over a network (or via other modalities).

The HDD 13 is preferably a magnetically-written storage apparatus. Generally, several magnetic recording media are accommodated in a drive unit and are rotated by a spindle motor at high speed. The media is coated with a nickel- or phosphorus-plated magnetic substance. By causing a magnetic head to scan the media surface rotating in the direction of the radius, magnetization corresponding to data is imparted to the media. Thus, the data is written or read onto/from the media. However, the principle of the present invention is not limited to an HDD, and the HDD may be replaced by other media which can record/play content.

In analog broadcasting, broadcast content received by the tuner 11 is encoded according to Moving Picture Experts Group (MPEG), for example, by the encoder section 12 and is stored on the 13. In digital broadcasting, encoded content is received and is stored in the HDD 13 as is. Encoded moving image program content is also distributed from the service site 20 and is stored in the HDD 13 as is.

The service site 20 includes a memory 21 and a transmission control section 22. The memory 21 stores pay or free moving image program content (e.g., a network program). The transmission control section 22 controls operations for distributing moving image program content over a broadband network. While only one service site 20 is shown for simplicity in the drawings, any number of service sites may be established over the Internet.

In accordance with a content play command from a user through the input apparatus 18, the play control section 15 reads and controls the playing of desired content from stored content on the HDD 13.

The decoder section 16 decodes recorded encoded content. The television monitor 17 then outputs and displays decoded audio signals and video signals, respectively.

The guide information creating section 19 unifies different kinds of guide information relating to content to be provided in forms compliant with different modalities, creates a list of the at-a-glance content guide information through a unified user interface and displays the list on the television monitor 17.

According to this embodiment, a user can instruct the play control section 15 to play a program on a unified guide information screen having an integration of program information for self-recorded programs, which are recorded broadcasting content, and network programs downloaded from the service site 20 (which will be described later). According to this embodiment, a user does not have to know whether a program to be played is a self-recorded program or a network program.

Next, processing for integrating guide information relating to content provided in formats compliant with different modalities and creating content guide information by the guide information creating section 19 will be described. According to this embodiment, content guide information is created by following the steps of:

(1) preparing a unified program list;
(2) operating during self-recording;
(3) retrieving a network program list;
(4) combining network program metadata;
(5) creating a user interface; and
(6) playing a program.

In other words, according to this embodiment, a unified program list having an integration of program content to be provided through different modalities, such as broadcasting programs and network programs, is created and is recorded in the HDD 13 or in another storage apparatus. Here, program metadata, which is retrieved in recording a self-recorded program, is additionally registered with the unified program list. For a network program, a network program list is periodically retrieved from the service site 20 and is modified and recorded in the unified program list. In order to play content, a user interface screen for display to and manipulation by a user is created based on an at-a-glance unified program list and is displayed on the screen of a monitor. When a program selected to be played by a user is a self-recorded program, the corresponding program is read from the HDD 13 and the content is played. If a selected program is a network program, the corresponding program is played in a streaming form over the Internet. These steps will be described in detail below.

(1) Preparing a Unified Program List

The terminal 10 prepares a unified program list in the HDD 13 during, for example, a production process. The unified program list is initially blank (without programs) during the production process (i.e., at the initial state). The unified program list can be in the form of, for example, XML (that is, extended Markup Language) or other structured description language.

Figure 2:
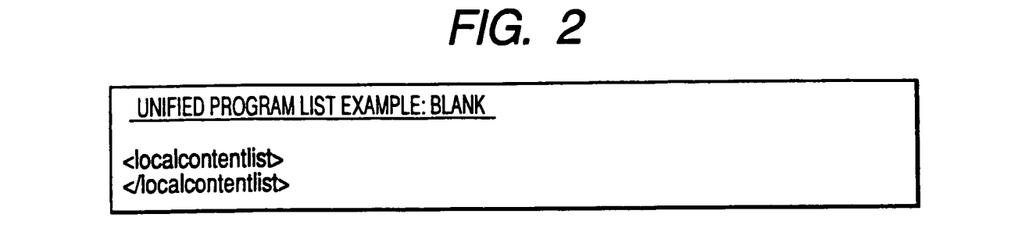
FIG. 2 is a diagram showing the construction of a blank unified program list.

FIG. 2 shows an example of a blank unified program list. Program content, such as a television broadcast program or a network program, is additionally registered with a field separated by a tag name, such as "localcontentlist" (which will be described later).

(2) Operating During Self-Recording

A user can instruct the terminal 10 to select a desired channel or record a program through the input apparatus 18. By selecting a channel and pressing a record button, a program received at that time is recorded (that is, it is self-recorded) onto the HDD 13. According to this embodiment, for a self-recorded program, program metadata retrieved during a recording operation is additionally registered with a unified program list.

Figure 3:
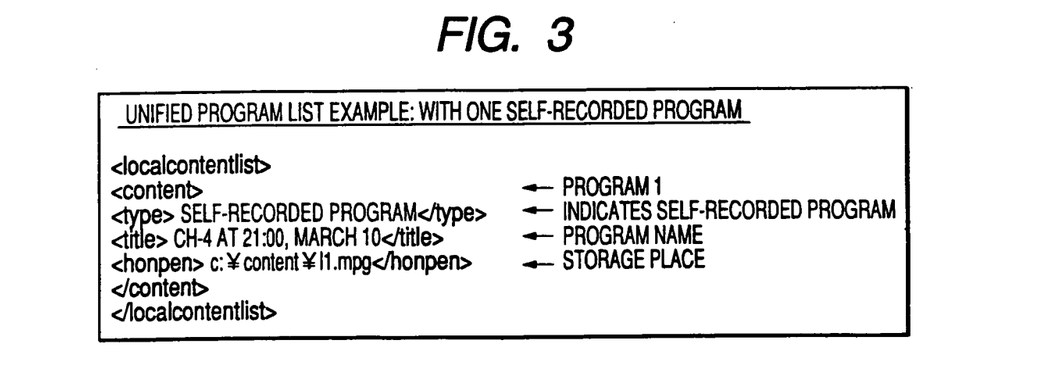
FIG. 3 is a diagram showing a unified program list including additionally registered metadata of a self-recorded program.

For example, when recording CH-4 (channel 4) is started at March 10 at 21:00, metadata of a corresponding self-recorded program is additionally recorded into a unified program list, as shown in FIG. 3. The metadata of the program is written in a tag field under a tag name, such as "content". The "content" field contains a "type" field, a "title" field and a "honpen" field. The "type" field indicates an attribute of a recorded program. The "title" field indicates a program name or identification information of a program. The "honpen" field indicates a place where content is stored. In the example shown in FIG. 3, a "content" field is additionally registered including: "self-recorded program" as "type"; "21:00, March 10, CH-4" (recorded date and time and channel name) as "title"; and "c:¥content¥l1.mpg" (directory on a local disk and file name) as "honpen" (storage place).

Figure 4:
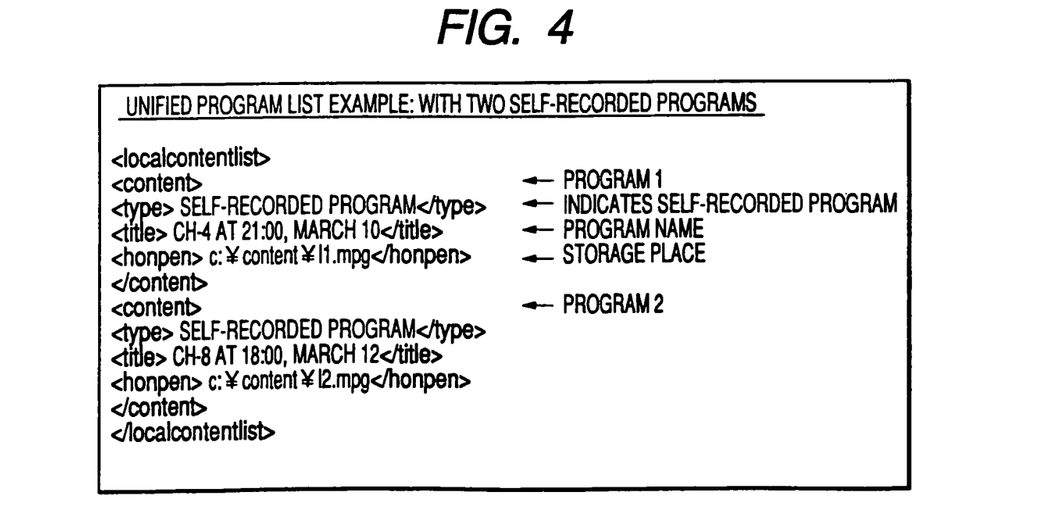
FIG. 4 is a diagram showing a unified program list including additionally registered metadata of a self-recorded program.

Furthermore, when recording of CH-8 (channel 8) is started at March 12 at 18:00, metadata of a corresponding self-recorded program is additionally recorded in a unified program list, as shown in FIG. 4. In the example in FIG. 4, a "content" field is additionally registered including: "self-recorded program" as "type"; "18:00, March 12, CH-8" (recorded date and time and channel name) as "title"; and "c:¥content¥l2.mpg" (directory on the local disk and file name) as "honpen" (storage place).

(3) Retrieving a Network Program List

In this example, upon powering on, the terminal 10 automatically accesses a predetermined service site over a network and retrieves a network program list. For example, an HTTP request is given to a URL on the network program list to extract data required for a unified program list from a program list returned as an HTTP response and to additionally register the data with the unified program list.

Figure 5:
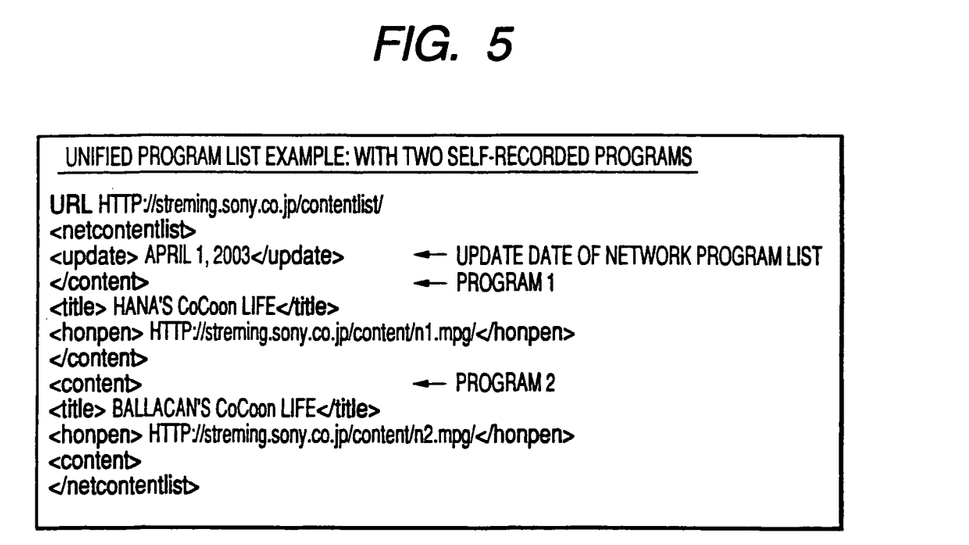
FIG. 5 is a diagram showing an example of a network program list, which has been retrieved over a network.

A network program list can be in the form of XML (extended markup Language), for example, or another structured description language. FIG. 5 shows an example construction of a network program list to be retrieved over a network. The network program list includes a URL (HTTP://streaming.sony.co.jp/contentlist) indicating a place of program content or an access method to program content. Then, a field separated by a tag name, such as "netcontentlist", includes an "update" field and a "content" field. The "update" field indicates an update date of a network program. The "content" field describes details of the content. Each of the fields separated by "content" tags includes a list of information on Network program content. A "title" field and a "honpen" field are included in each "content" field. The "title" field indicates a name of the network program or identification information of the network program. The "honpen" field indicates a storage location of the content. Unlike with a self-recorded program, the location in a network space or an access method (URL) is described in a "honpen" field.

In the example shown in FIG. 5, the "netcontentlist" field includes information on two network programs as "content" fields. One of the "content" fields includes the network program name "Hana's Cocoon Life" as the "title" and the location or access method of "HTTP://streaming.sony.co.jp/content/n1.mpg" as the "honpen". The other "content" field includes the network program name "Ballacan's Cocoon Life" as the "title" and the location or access method of "HTTP://streaming.sony.co.jp/content/n2.mpg" as the "honpen".

After a network program list is retrieved upon power on, a current or later network program list may be retrieved periodically or in accordance with predetermined times. When detail of a network program is updated, a corresponding detail of the unified program list is modified and registered in accordance with the update.

(4) Combining Network Program Metadata

Network program metadata on a unified program list, if any, is deleted. Metadata in a retrieved network program list is additionally recorded in the unified program list.

Figure 6:
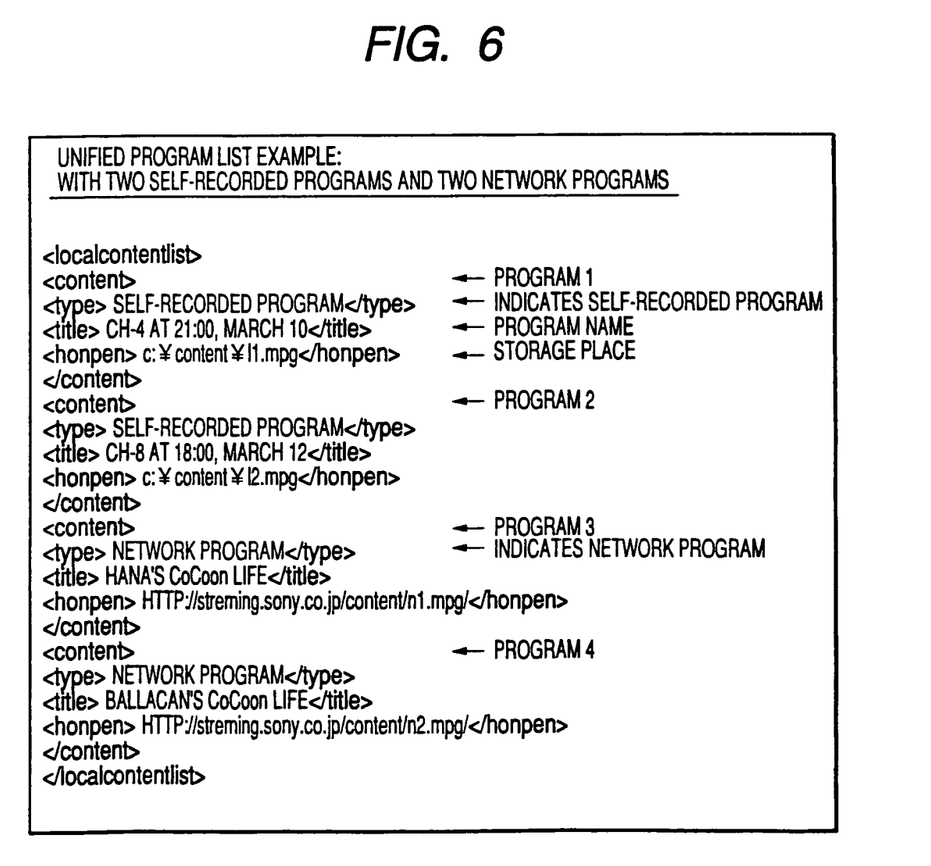
FIG. 6 is a diagram showing a result of synthesis of the unified program list shown in FIG. 4 and network program data extracted from metadata of the network program shown in FIG. 5.

FIG. 6 is a diagram showing a result of the synthesis of the unified program list shown in FIG. 4 and network program data extracted from metadata of the Network program shown in FIG. 5. As with a self-recorded program, data of a network program is written in a tag field under the tag name, "content". The "content" field contains a "type" field, a "title" field and a "honpen" field (as described above). The "type" field indicates an attribute of the recorded program. The "title" field indicates the program name or identification information of the program. The "honpen" field indicates a location where the content is stored.

In the example shown in FIG. 6, "content" fields are additionally registered for two network programs retrieved from network program metadata as shown in FIG. 5. One of the "content" fields includes: "NETWORK PROGRAM" as the "type"; the network program name "Hana's Cocoon Life" as the "title"; and the location or access method of "HTTP://streaming.sony.co.jp/content/n1.mpg" as the "honpen". The other added "content" field includes: "NETWORK PROGRAM" as the "type", the network program name "Ballacan's Cocoon Life" as the "title" and the location or access method of "HTTP://streaming.sony.co.jp/content/n2.mpg" as the "honpen".

(5) Creating a User Interface

Figure 8:
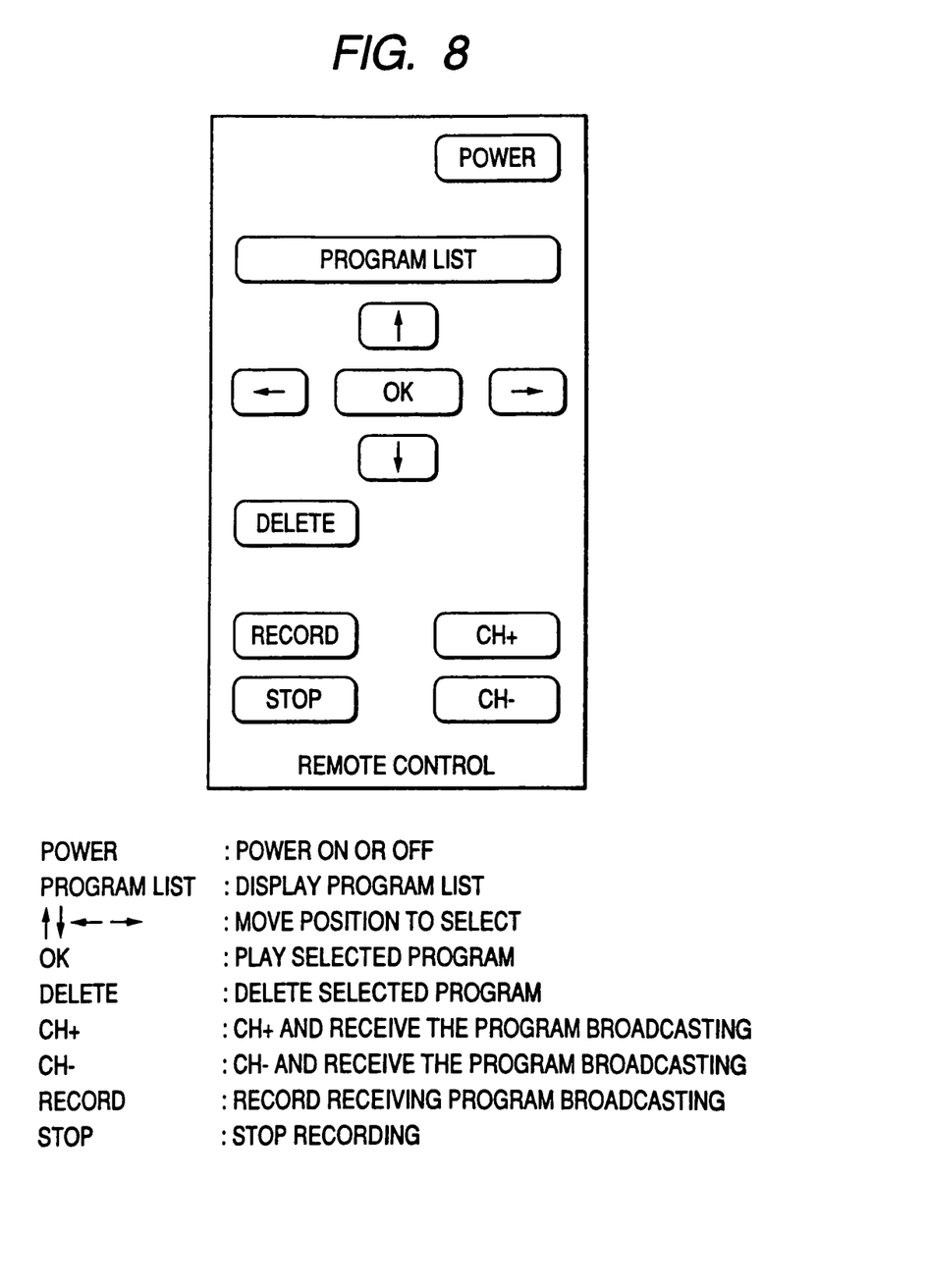
FIG. 8 is a diagram showing a sample construction of an operating panel of a remote control for a terminal 10.

A program list is displayed on a screen based on the unified program list in response to the pressing of a program list button on a remote control (see FIG. 8) for the terminal 10, for example. All content is comprehensively and uniformly handled and can be viewed at glance on the user interface program list irrespective of the modality, such as a television broadcasting or a network program. Thus, the user does not need to know the modality or storage location of the displayed content.

Figure 7:
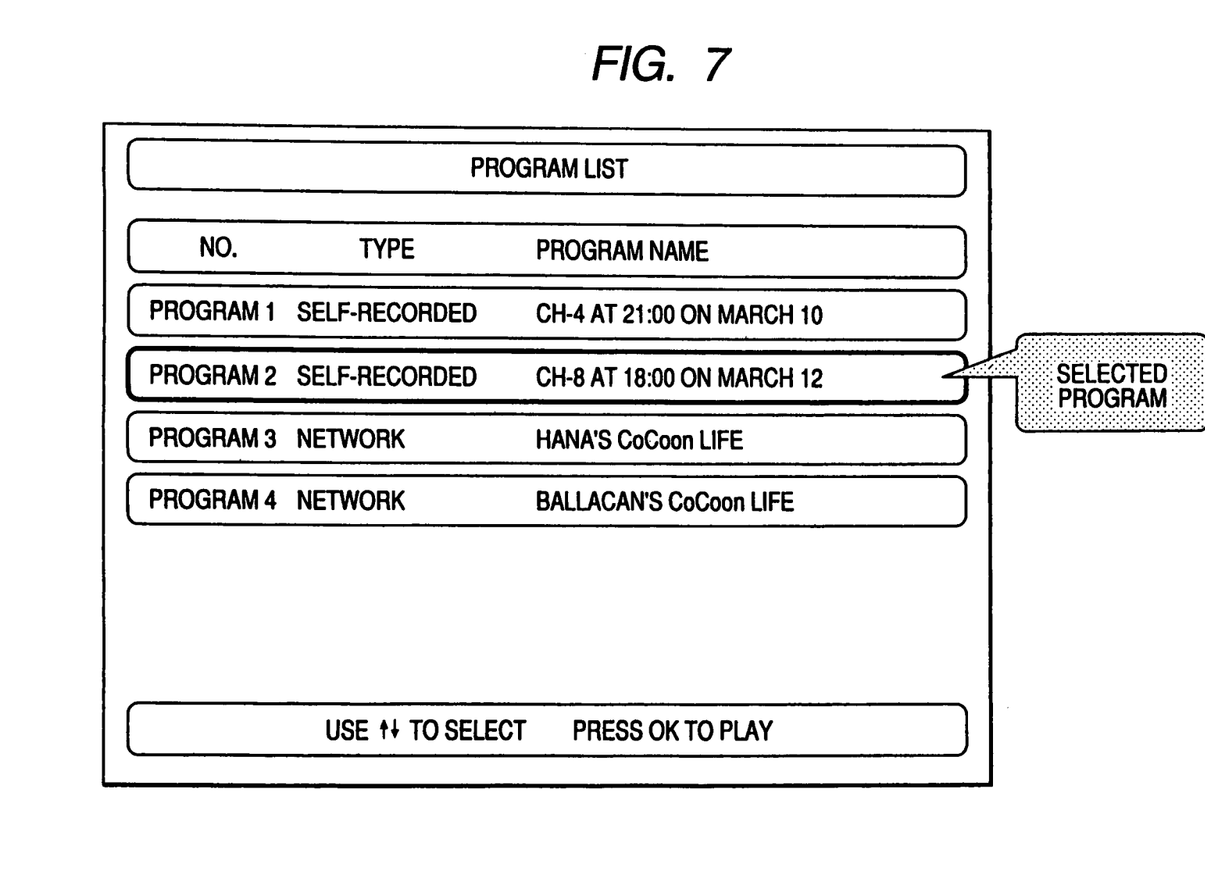
FIG. 7 is a diagram showing a sample screen of a unified program list.

FIG. 7 shows a sample screen of a unified program list. In this example, program types and program names of content, which can be played on the terminal 10, are displayed in a list form. A user can play a program by manipulating a cursor button on a remote control, for example, by placing a cursor over a specific program and pressing a "CONFIRM" button.

Programs may be displayed in order of registration with (description in) the unified program list shown in FIG. 6 or may be rearranged in order of viewing support information or other information or programs.

(6) Playing a Program

When a desired program is selected by using a remote control, for example, and the "OK" button is pressed on the user interface program list shown in FIG. 7, playing of the program is started.

Here, when a program selected to be played by a user is a self-recorded program, the corresponding program is read from the HDD 13, and the content is played. When a selected program is a network program, the corresponding program is played by streaming over the Internet.

Although the invention has been described in detail above with reference to particular embodiments, it is to be understood that embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A content guide information processing apparatus for guiding content viewing, comprising:
   a content receiver for receiving content through different modalities;
   a memory for storing received content;
   a content player for playing received or stored content;
   a content guide information management section for managing content guide information having integration of content received through different modalities to be supplied; and
   a supply section for supplying content guide information, the content guide information includes guide information for already received content and guide information for content yet to be received, the content guide information is in the form of a structured description language, and generation of the content guide information includes adding a structured description language type-field to the guide information for content yet to be received,
   respective contents being associated with respective types, each type indicating whether the corresponding content is already received content or content yet to be received,
   for already received content the guide information indicates a directory in which the content is stored, and for content yet to be received the guide information indicates a network address pointing to the content,
   upon powering on the apparatus automatically sends an HTTP request for a network program list, receives an HTTP response comprising the network program list, extracts data required for the content guide information from the network program list, and registers the extracted data with the content guide information,
   when a user selects a program for recording, program metadata retrieved during the recording operation, including an indication that the program is self-recorded, is registered with the content guide information,
   the metadata retrieved during the recording operation being written in a tag field under a tag name, the tag field including a type field, a title field, and a location field, the type field indicating that the program is self-recorded, the title field indicating the recorded date and time and channel name for the program, and the location field indicating a directory on a local disk and a file name.

2. A content guide information processing apparatus according to claim 1, wherein the content receiver receives program content through television broadcasting or a distribution service over a network.

3. A content guide information processing apparatus according to claim 1, wherein the content guide information management section manages a uniformly described unified program list as content guide information irrespective of differences in modality for received content.

4. A content guide information processing apparatus to claim 2, wherein the content receiver retrieves program metadata in response to receiving television broadcasting or receives a program list periodically or in a predetermined timing from a service site distributing moving image programs.

5. A content guide information processing apparatus to claim 1, wherein the content guide information management section additionally registers contents information with the content guide information when the content is stored in the memory.

6. A content guide information processing apparatus to claim 1, wherein the content guide information management section additionally registers or modifies and registers a detail of a program list with the content guide information when the program list is received periodically or in predetermined timing from a service site distributing moving image programs.

7. A content guide information processing apparatus to claim 1, further comprising a user input device for selecting desired content by a user on content guide information supplied by the supply section, and wherein the content player starts playing content selected through the user input device.

8. A content guide information processing apparatus according to claim 7, wherein the content player plays content from the memory when the content is already stored in the memory and plays content in a streaming manner when the content is distributed from a predetermined service site on a network.

9. A content guide information processing apparatus according to claim 1, wherein the memory encodes received content and stores the encoded content.

10. A content guide information processing method for using a processor of an apparatus to guide content viewing, comprising:
   receiving content through different modalities;
   storing received content;
   playing the received or the stored content;
   managing content guide information having an integration of content supplied and received through different modalities; and
   supplying content guide information,
   the content guide information includes guide information for already received content and guide information for content yet to be received, the content guide information is in the form of a structured description language, and generation of the content guide information includes adding a structured description language type-field to the guide information for content yet to be received,
   respective contents being associated with respective types, each type indicating whether the corresponding content is already received content or content yet to be received,
   for already received content the guide information indicates a directory in which the content is stored, and for content yet to be received the guide information indicates a network address pointing to the content, upon powering on the apparatus automatically sends an HTTP request for a network program list, receives an HTTP response comprising the network program list, extracts data required for the content guide information from the network program list, and registers the extracted data with the content guide information, when a user selects a program for recording, program metadata retrieved during the recording operation, including an indication that the program is self-recorded, is registered with the content guide information, the metadata retrieved during the recording operation being written in a tag field under a tag name, the tag field including a type field, a title field, and a location field, the type field indicating that the program is self-recorded, the title field indicating the recorded date and time and channel name for the program, and the location field indicating a directory on a local disk and a file name.

11. A content guide information processing method according to claim 10, further comprising receiving the program content through television broadcasting or a distribution service over a network.

12. A content guide information processing method according to claim 10, further comprising managing the content guide information by managing a uniformly described unified program list as content guide information irrespective of differences in modality for received content.

13. A content guide information processing method according to claim 11, further comprising retrieving program metadata in response to receiving television broadcasting or receiving a program list periodically or in predetermined timing from a service site distributing moving image programs.

14. A content guide information processing method according to claim 10, further comprising managing the content guide information by registering content information with the content guide information when the content is stored.

15. A content guide information processing method according to claim 10, further comprising managing the content guide by registering or modifying and registering a detail of a program list with the content guide information when the program list is received periodically or in predetermined timing from a service site distributing moving image programs.

16. A content guide information processing method according to claim 10, further comprising selecting desired content by a user from the supplied content guide information and playing the content selected by the user.

17. A content guide information processing method according to claim 16, further comprising reading and playing content stored to be played when the content is already stored in the content storage step or playing content in a streaming manner when the content is distributed from a predetermined service site on a network.

18. A content guide information processing method according to claim 10, further comprising encoding received content when required and storing the encoded content.

19. A non-transitory storage medium storing a program executable on an information processing system, the program causing the system to:

receive content through different modalities;

store received content;

play received or stored content;

manage content guide information having an integration of content supplied and received through different modalities; and supply content guide information, wherein the receiving of content retrieves program metadata in response to receiving television broadcasting or a program list periodically or in predetermined timing from a service site distributing moving image programs, and wherein the content guide information managing additionally registers content information with the content guide information when the content is stored or registers or modifies and registers a detail of a program list with the content guide information when the program list is received periodically or in predetermined timing from a service site distributing moving image programs, the content guide information includes guide information for already received content and guide information for content yet to be received, the content guide information is in the form of a structured description language, and generation of the content guide information includes adding a structured description language type-field to the guide information for content yet to be received, respective contents being associated with respective types, each type indicating whether the corresponding content is already received content or content yet to be received, for already received content the guide information indicates a directory in which the content is stored, and for content yet to be received the guide information indicates a network address pointing to the content, upon powering on the system automatically sends an HTTP request for a network program list, receives an HTTP response comprising the network program list, extracts data required for the content guide information from the network program list, and registers the extractive data with the content guide information, when a user selects a program for recording, program metadata retrieved during the recording operation, including an indication that the program is self-recorded, is registered with the content guide information, the metadata retrieved during the recording operation being written in a tag field under a tag name, the tag field including a type field, a title field, and a location field, the type field indicating that the program is self-recorded, the title field indicating the recorded date and time and channel name for the program, and the location field indicating a directory on a local disk and a file name.

* * * * *